United States Patent [19]
Coughlan

[11] 3,735,684
[45] May 29, 1973

[54] REFLEX CAMERA WITH MEANS TO REDUCE MIRROR REBOUND

[75] Inventor: Edward H. Coughlan, Canton, Mass.

[73] Assignee: Polaroid Corporation, Cambridge, Mass.

[22] Filed: May 26, 1971

[21] Appl. No.: 146,881

[52] U.S. Cl. ............................................. 95/42
[51] Int. Cl. ........................................ G03b 19/12
[58] Field of Search ................................... 95/42

[56] References Cited

UNITED STATES PATENTS

2,997,934   8/1961   Heerklotz ....................... 95/42
3,507,199   4/1970   Sato ............................. 95/42

Primary Examiner—Samuel S. Matthews
Assistant Examiner—E. M. Bero
Attorney—Brown and Mikulka and Gerald L. Smith

[57] ABSTRACT

A single-lens reflex camera having a drive system including a variable acceleration erecting arrangement for moving a reflecting member within an optical path from a viewing position to an erected exposure position. The variable acceleration erecting arrangement is operative to selectively impart both positive and negative accelerating forces to the reflecting member during selected portions of its movement. The forces are operative to drive the reflecting member to its exposure position quickly and reduce the elastic rebound which is generated by impact at a contact surface positioned at its erected exposure position.

17 Claims, 11 Drawing Figures

FIG. 1

INVENTOR.
EDWARD H. COUGHLAN
BY Brown and Mikulka
William A. Danchuk
ATTORNEYS

INVENTOR
EDWARD H. COUGHLAN
BY
Brown and Mikulka
and
William A. Danchuk
ATTORNEYS

REFLEX CAMERA WITH MEANS TO REDUCE MIRROR REBOUND

BACKGROUND OF THE INVENTION

Reflex cameras have been developed incorporating reflecting member assemblies which are moved during a photographic cycle to convert an optical path from a viewing to an exposure configuration. Where these cameras are of a hand-held variety, it is desirable to move the reflecting member to its exposure position rapidly at the commencement of an exposure cycle. The minimization of the time required for this activity is generally carried out by relatively large drive spring arrangements.

Movement of the reflecting member is abruptly halted when it strikes an interrupting structure located at the exposure position. This necessary abrupt interruption results in a phenomenom commonly known as elastic rebound. Where, in this terminal position, the surface of the reflecting member becomes part of the taking optical path, any significant dynamic instability will produce unacceptable vibration resulting in focusing error. Further, such impacting of the reflecting member may cause unwanted camera vibration.

Energy-absorbing techniques, some of which incorporate energy-absorbing materials at the terminal position of the member, are characterized in either partially destructing after each use or being too complicated in design for popularly priced, high-production cameras. Any design ideally should provide for high-speed reflecting member movement from its viewing to its exposure position and abrupt stopping upon reaching that position. Additionally, such a design should provide for a significant amount of residual torque which is applied to the member to retain it at its terminal position. In some design approaches, a balance is struck between providing a desirably rapid reflecting member movement and diminishing the time required for damping through a compromising selection of lower-rate drive spring systems.

Moving the reflecting member to its exposure position in a relatively short time is an operation which may be easily achieved by incorporating relatively heavy drive springs. While suited to raise the member quickly, these springs introduce a need for accommodating a corresponding long vibration time.

SUMMARY OF THE INVENTION

The present invention is addressed to cameras of the single-lens reflex variety and, more specifically, to a drive system including a variable acceleration erecting arrangement for moving a reflecting member within an optical path from a viewing position to an erected exposure position. This motion of the reflecting member converts the optical path from an image viewing configuration to an exposure configuration.

Forces produced by a prewound drive spring are employed for driving the operator assembly to its exposure position at a relatively fast rate subsequent to depression of a camera start button. The variable acceleration arrangement functions to selectively impart both negative and positive accelerating forces to the operator assembly during predetermined portions of its movement. These forces are operative to drive the operator assembly to its exposure position quickly and reduce the elastic rebound which is generated by impact at a contact surface positioned at its erected exposure position.

In a preferred embodiment, the photographic apparatus of the present invention is incorporated within a reflex camera having a reflecting member movable between viewing and exposure positions. A drive spring is employed for moving the member to its exposure position. The drive spring is of a low-rate torsion variety characterized in having a low-torque dissipation through a given excursion angle. A ram, formed as a part of a control linkage assembly, is connectable to the reflecting member drive system and is movable in correspondence with the reflecting member when the latter is released for spring driven movement. A portion of the ram is selectively configured so as to be engageable with a force-modulating member. Upon depression of the camera's start button, a phase control cam is rotated releasing both the reflecting member and the ram for accelerated movement under the influence of the drive spring. Accelerated movement of the reflecting member is permitted until the ram modulating portion moves into engagement with the force-modulating member. Upon contacting the force-modulating member, a reverse force is applied to the ram, resulting in a lowering of its acceleration rate. This decrease in acceleration is transferred through the drive system to the reflecting member effecting a selective decrease in its acceleration. Continued movement of the ram into deeper engagement with the force-modulating member reverses the forces imposed upon it. This reversal results in an increasing acceleration of the ram toward its terminal position and enhances the imposition of a residual torque upon the reflecting member, thereby improving the retention of the latter at its exposure position.

With the configuration as such, the force-modulating member and ram-modulating portion are operative to first retard and, subsequently, to assist the movement of the reflecting member toward its terminal position. The importance of lowering the acceleration rate of the reflecting member during a portion of its movement is best realized when considered in light of the interrelationship between velocity and rebound. Since elastic rebound is a direct function of velocity, a minimization of the latter is desirable. A lowering of the acceleration value of the reflecting member during a select portion of its upward movement results in a decrease in velocity, and hence, rebound. Subsequent acceleration of the ram imparts a residual holding force or torque to the reflecting member for retaining it at its terminal exposure position.

Another feature and object of the present invention is to provide a reflex photographic apparatus for converting an optical path from a viewing configuration to an exposure configuration by spring driven movement of a reflecting member between viewing and exposure positions, the apparatus including a selective acceleration arrangement which is operative to suppress the velocity of the reflecting member during predetermined portions of its movement and, subsequently, to accelerate the reflecting member into its exposure position, thereby retaining it there.

A further feature and object of the present invention is to provide a reflex photographic apparatus for converting an optical path between a viewing configuration and an exposure configuration, the apparatus consisting of a reflecting member movable between a viewing position and a terminal exposure position, a drive spring having a given torque output for urging the reflecting member to move from its viewing position to its terminal exposure position, a control linkage assembly which is connected with the reflecting member and is actuable to release the reflecting member for spring driven movement, and a force-modulating member coupled with the control linkage assembly operative to selectively modulate the torque output of the drive spring to suppress the velocity of the reflecting member during predetermined portions of its movement, whereby reflecting member rebound is minimized when it is halted at its terminal exposure position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings.

DETAILED DESCRIPTION OF THE DRAWINGS

DETAILED DESCRIPTION OF THE INVENTION

An important embodiment of the present invention concerns a fully automatic single-lens reflex camera which may be folded for purposes of being carried in the pocket of a garment. The camera is designed having an optical path which is operationally converted between viewing and exposure mode configurations.

Figure 1:
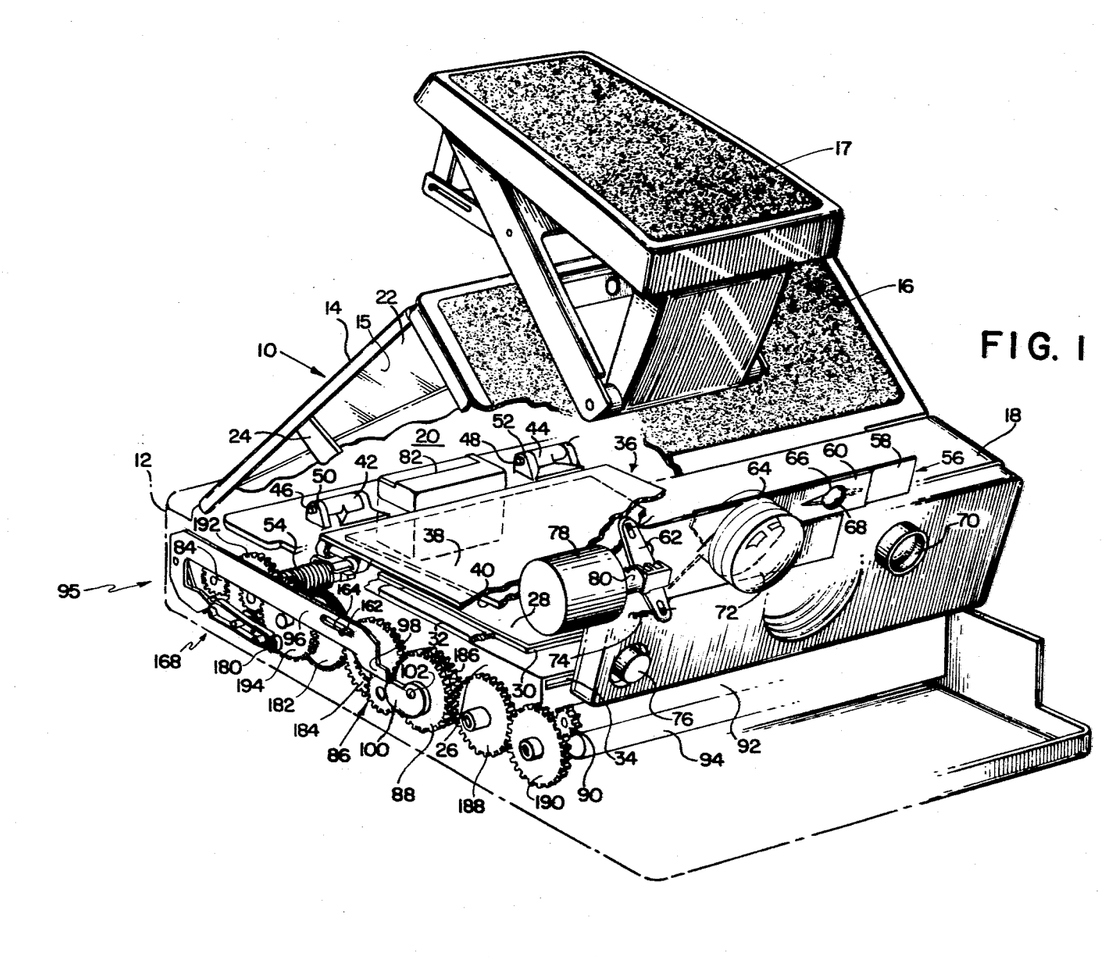
FIG. 1 is a pictorial representation of a single-lens reflex camera according to the invention showing its erected shape with portions broken away to reveal internal structure.

Referring to FIG. 1, an automatic, single-lens reflex camera according to the present invention is illustrated generally at 10. Camera 10 is shown in an erected configuration wherein it is ready to carry out a photographic cycle. The camera 10 is structured having a rectangularly shaped base 12 which pivotally supports a combination of components erectable therefrom into the orientation shown in preparation for camera operation. These components generally include a rear wall 14 having one end hinged to base 12 and an opposite end hinged to a forward wall 16. Forward wall 16 likewise is pivotally connected to the upper rear edge of an exposure control housing 18. Housing 18 is coupled with base 12 by a pivotal connection made along its rearwardly facing lower edge. Base structure 12, rear wall 14, forward wall 16 and the exposure control housing 18 combine in the erected state illustrated to form an exposure chamber 20. A mirror 15 is positioned upon rear wall 14 with its reflective surface facing inwardly. Mirror 15 is used for viewing purposes only. An opaque bellow, a fragment of which is shown at 22, provides a lighttight configuration for exposure chamber 20. Erecting linkages as at 24 hold the above-outlined components in properly erected positions. Pivotally mounted upon forward wall 16 is a view finder 17. Finder 17 is constructed having collapsible elements (not shown) which allow it to be folded down upon forward wall 16 when not in use. Positioned at the bottom of exposure chamber 20 and supported by base 12 is a disposable cassette structure 26. Cassette structure 26 retains a plurality of stacked film units, the uppermost one of which is positioned at 28 in coincidence with the exposure plane of camera 10. A film frame opening 30, formed within the upper portion of cassette 26, permits light to fall upon film unit 28. Cassette 26 is properly positioned within the base 12 by frame members as at 32 which communicate with the ridge of the film opening of cassette 26. An opening 34 is provided within a peripheral side of the cassette for removal of the uppermost film unit 28 for processing following its exposure.

With the orientation shown in FIG. 1, the components of camera 10 provide for its operation in a viewing configuration. A reflecting member, shown generally at 36, is retained in its spring loaded or cocked orientation over the film frame opening 30 blocking the passage of light therethrough. Reflecting member 36 is configured having a viewing surface 38 on one side and a reflecting surface 40 on its opposite side. Viewing surface 38 faces into the exposure chamber 20 when reflecting member 36 is in a viewing mode configuration. Likewise, reflecting surface 40 faces into exposure chamber 20 when reflecting member 36 is in an exposure orientation.

Member 36 is coupled to the rear of base 12 through hinge extensions 42 and 44. Extensions 42 and 44 are journaled for rotation about shafts 46 and 48, respectively. Shafts 46 and 48 are supported from dual extensions 50 and 52, respectively, of the frame of base 12.

Reflecting member 36 is biased for upward rotation about its hinge extensions 42 and 44 in a direction away from the exposure plane of film unit 28 by a drive spring 54.

Exposure control housing 18, hinged at the forward portion of base 12, contains a dual bladed shutter, shown generally at 56. Shutter 56 is structured having two mutually coacting blades 58 and 60 which reciprocally move by virtue of their coupling with a reciprocating beam 62. Blades 58 and 60 are configured having selectively tapered aperture openings which cooperably define a progressively varying aperture 64 as the beam 62 is rotated about its center point. The size of aperture 64 will vary with light levels and related exposure parameters during an exposure interval. Shutter blades 58 and 60, respectively, are configured having secondary tapered aperture openings 66 and 68 which cooperate to define a variable aperture over photocell 70 positioned on the front edge of exposure control housing 18. Configured as such, an input corresponding to both scene brightness and to the size of aperture 64 may be supplied to a photosensing control network (not shown). Additionally incorporated within exposure control housing 18 is an objective lens system 72 positioned in front of aperture 64.

During the viewing mode of a photographic cycle, the camera establishes an optical path extending from objective lens system 72 in exposure control housing 18 to mirror 15 fixed to the inward side of rear wall 14 and then to the viewing surface 38 formed on the upward facing portion of reflecting member 36. Surface 38 is configured having a texture and optical design which aids the focusing of the image of a scene to be photographed. This image may be viewed by the camera operator through an optical assembly (not shown) contained within view finder 17. View finder 17 and its related internal components are described in detail in a copending application for U.S. Pat. by James G. Baker, filed Dec. 15, 1970 entitled, "Reflex Camera and Viewing Device," Ser. No. 98,356, and assigned in common herewith.

When camera 10 is in its viewing configuration, shutter 56 is retained at its maximum aperture width by virtue of tension exerted by a spring 74 connected between beam 62 and exposure control housing 18. Positioned within exposure control housing 18 is a solenoid 78 and an associated plunger 80. Energization of solenoid 78 draws plunger 80 inwardly, thereby causing beam 62 to rotate. Rotation of beam 62 moves shutter blades 58 and 60 to close shutter 56.

Positioned at the rearward portion of base 12 is an electric motor 82. Providing power for a variety of operational functions within camera 10, the output of motor 82 is coupled to an input gear 84 of a multicomponent gear train illustrated generally at 86 forming part of a control linkage arrangement or assembly 95. Described in detail in a copending application for U.S. Pat. entitled, "Reflex Camera," by Edwin H. Land, Igor Blinow and Vaito K. Eloranta, Ser. No. 134,733, filed Apr. 16, 1971 and assigned in common herewith, gear train 86 is formed of a series of five idler gears 182–190 and two reduction gears 192 and 194. Gear train 86 provides a selective speed reduction motive output at a timing gear 88 and a processing drive output at a drive gear 90. Gear 90 is coupled to a pair of processing rollers 92 and 94 positioned at the forward edge of base 12.

Control linkage assembly 95 is selectively actuable to release reflecting member 36 for spring driven movement to its exposure position.

During a photographic cycle, camera 10 is converted between the viewing mode orientation described above and an exposure mode orientation for exposing a film unit. A photographic cycle is commenced by depression of start button 76 mounted upon exposure control housing 18. The depression of button 76 closes electronic switches (not shown) which are operative to cause a control circuit to initially energize solenoid 78 from a battery power source (not shown) contained within film cassette 26. Energization of solenoid 78 causes plunger 80 to be drawn inwardly, whereby shutter blades 58 and 60 are moved to close shutter 56. Subsequent to shutter closure, motor 82 is briefly energized, the output of which is coupled to input gear 84. Rotation of input gear 84 is transferred to timing gear 88 through gear train 86.

Initial rotation of timing gear 88 unlatches control linkage assembly 95, whereby reflecting member 36 is released for rapid spring driven movement towards its exposure position adjacent rear wall 14. Reflecting member 36 travels through an excursion angle of 37° from its viewing position to its exposure position adjacent rear wall 14. If reflecting member 36 should contact rear wall 14 with sufficient forward velocity, as it does when it is rapidly driven into its exposure position, it will bounce. This activity is commonly referred to as "elastic rebound." Due to the hand-held nature of the present camera, and the use of a reflective surface of reflecting member 36 within the optical path of the camera during an exposure interval, any significant amount of reflecting member rebound may produce undesirable vibration resulting in focusing error. Additionally, such impacting of the reflecting member may cause unwanted camera vibration which may be evidenced within the camera's optical path. If focusing error is to be minimized, an internal delay, corresponding to the damping time of the reflecting member, must be incorporated within the camera. These delays, however, are relatively expensive for incorporation within a popularly priced camera.

Incorporated within the present camera is a variable acceleration erecting system which is operative to selectively modulate the torque output from drive spring 54 to reflecting member 36. As a result, there is realized a suppression of the reflecting member velocity during predetermined portions of its movement. Consequently, reflecting member rebound is inhibited when it is abruptly halted at its terminal exposure position. The torque modulation of the output of drive spring 54 occurs during select portions of the rotational travel of reflecting member 36 and is described herein in connection with a series of charts.

Figure 9:
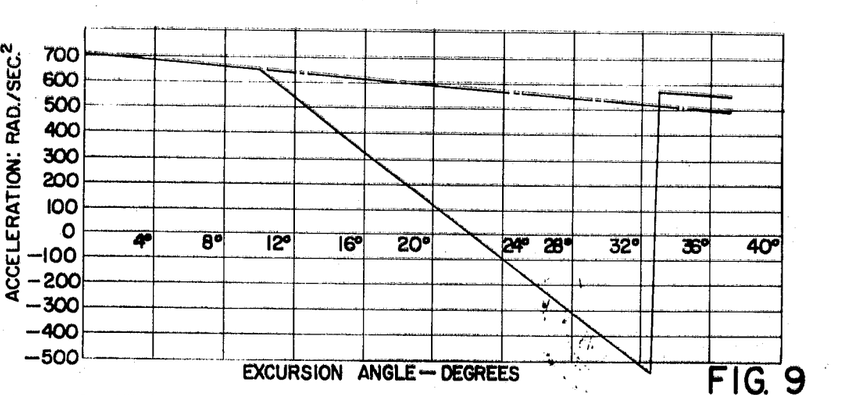
FIG. 9 is a chart showing the relative acceleration rates of the reflecting member of the camera of FIG. 1 with and without the incorporation of various components of the mechanism of the invention.
Figure 10:
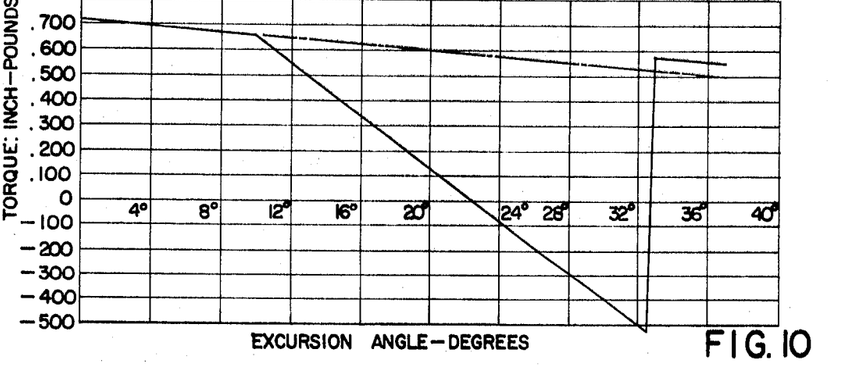
FIG. 10 is a chart showing the relative torque rates of the reflecting member of the camera of FIG. 1 with and without the incorporation of various components of the mechanism of the invention.

Referring to FIG. 10, the torque applied to reflecting member 36 through its excursion angle $\theta$ is shown. Reflecting member 36 is permitted to rotate from its initial position through approximately 10° before there is any torque modulation. At 10° of rotation, the variable acceleration system becomes operative to produce a negative force vector, thereby effecting a lowering of the torque applied to reflecting member 36. At approximately 33° of rotation, the sign of the force vector applied by the variable acceleration system is reversed and a sharply increasing torque is applied to reflecting member 36. This increasing torque continues through movement of reflecting member into its terminal exposure position at 37° of rotation. Note with reflection to FIG. 10, that the torque applied to reflecting member 36 from 33° to 37° of rotation is returned to approximately the same level as was present before the variable acceleration system became operative. Looking to FIG. 9, the acceleration curve for reflecting member 36 is shown to be of approximately the same configuration as that of the torque. This is due to the proportionality between torque and acceleration. For instance, reflecting member 36 is allowed to accelerate freely from 0° to 10° under the bias imparted thereto from drive spring 54. Between 10° and 33° the acceleration of member 36 is decreased at a rate which produces a negative acceleration between 22° and 33° of rotation. Vector forces applied by the variable acceleration system to member 36 between 33° and 37° are operative to rapidly increase the acceleration rate and return it to the level as was present before the activity of the variable acceleration system.

Figure 11:
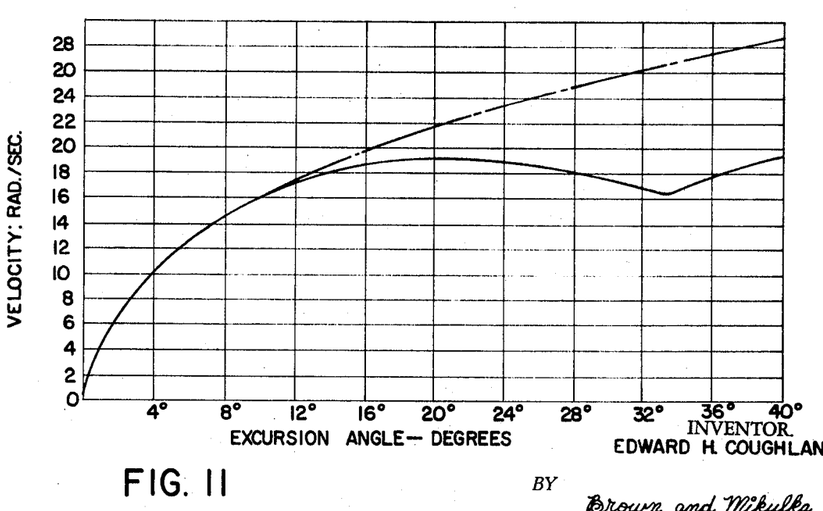
FIG. 11 is a chart showing the relative velocity rates of the reflecting member of the camera of FIG. 1 with and without the incorporation of various components of the mechanism of the invention.

A graph of the velocity of reflecting member 36 as it is driven to the exposure position is shown in FIG. 11. Due to the selective modulation of the torque applied to reflecting member 36, the velocity of the member as it closely approaches contact with rear wall 14 is substantially reduced when compared to the velocity of the reflecting member if no variable acceleration system were present. Note in this regard, that in FIGS. 9 – 11, broken line portions of the graphs are included to represent, respectively, the acceleration, torque, and velocity which reflecting member 36 would evidence had there been no variable acceleration system.

Returning to FIG. 1, after reflecting member 36 is seated in its exposure mode position, a photographic cycle continues with de-energization of solenoid 78. De-energization of solenoid 78 permits shutter blades 58 and 60 to open, thereby initiating an exposure. The optical path for such exposure extends from objective lens system 72 and aperture 64 to reflecting surface 40 now adjacent rear wall 14. The image from surface 40 is then reflected into film opening 30 to expose an uppermost film unit 28. To terminate an exposure interval, solenoid 78 is again energized causing shutter blades 58 and 60 to close. Motor 82 then is energized to again drive the gear train 86 for purposes of cocking as well as processing an exposed film unit. Processing is carried out by drawing an uppermost film unit 28 through opening 34 to be engaged by processing rollers 92 and 94, thereby spreading a self-contained developing liquid along the composite film structure. Simultaneous with the processing of film unit 28, motor 82 is operative to actuate control linkage assembly 95, thereby returning operator assembly 36 to its viewing position. During this movement, drive spring 54 is rewound, returning it to its prewound status. When reflecting member 36 is fully returned to its viewing position, motor 82 is shut off. Simultaneously, solenoid 78 is again de-energized to open shutter blades 58 and 60, thereby returning camera 10 to its viewing mode orientation.

Figure 2:
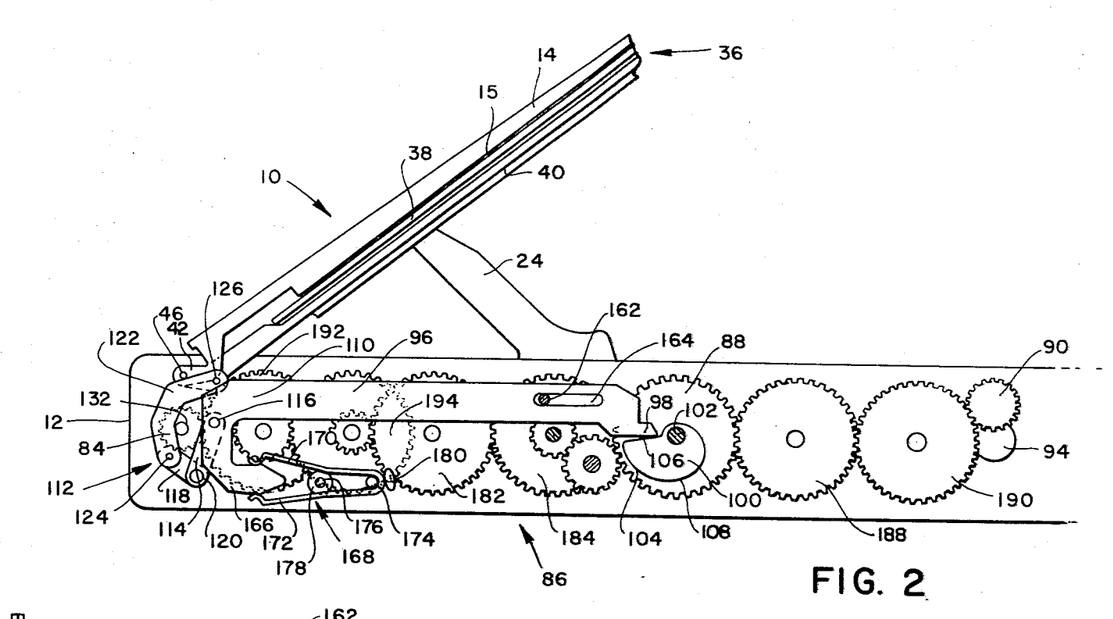
FIG. 2 is a side elevational fragmentary view of portions of the camera of FIG. 1.
Figure 4:
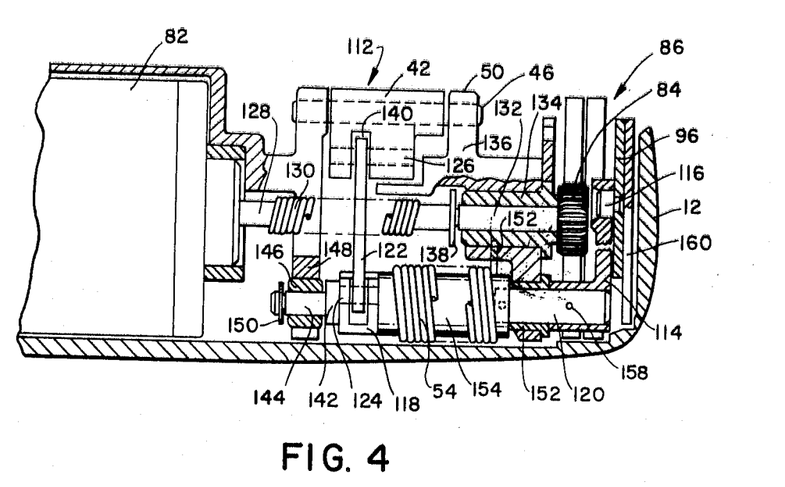
FIG. 4 is a rear fragmentary view of the motor and drive assembly of the camera of FIG. 1 with portions broken away to more clearly reveal internal structure.

The control linkage assembly 95 includes a kinematic linkage arrangement. This kinematic linkage basically contains two elements, a ram 96 and a cam 100. When the camera is in a viewing mode, cam 100 and ram 96 serve to retain reflecting member 36 in its cocked position. As seen in FIG. 2, the rearward end 110 of ram 96 is connected through appropriate secondary linkages with a four-bar linkage assembly, shown generally at 112. Assembly 112, in turn, is coupled in driving relationship with reflecting member 36. Referring additionally to FIG. 4, the secondary linkages which connect ram 96 with four-bar linkage 112 are present as arm 114 and shaft 120. Arm 114 is pivotally connected to ram end 110 through a pin 116. The opposite end of arm 114 is pivotally connected to a bell crank 118 by a shaft 120. The connection of bell crank 118 to shaft 120 forms the first component of four-bar linkage 112. The opposite end of bell crank 118 is journaled to a draw-down link 122 through a pin 124. Draw-down link 122, in turn, is connected to hinge extension 42 through a pin 126. Forming the final component of four-bar linkage assembly 112, shaft 46 pivotally couples hinge extension 42 of operator assembly 36.

The motorized drive components for powering gear train 86 are revealed in detail along with the spring drive assembly for moving reflecting member 36 in FIG. 4. Motor 82 is attached to the rear portion of frame 12 adjacent the rear edge of cassette 26. The output shaft 128 of motor 82 is coupled to input gear 84 through a spring-type slip clutch 130 and shaft 132. Fixed to gear 84, shaft 132 is rotatably supported within a bushing 134 fixed to an inner portion 136 of frame 12. An E-ring 138 is connected to shaft 132 to inhibit its longitudinal movement within bushing 134. Extension 42 of member 36 is formed having an access slot 140 within which pivotal connection between shaft 126 and draw-down link 122 is effected.

Bell crank 118 is formed having a hub portion 142 which is rotatably mounted upon a cylindrical shaft 144. Shaft 144 is rotatably supported within a bushing 146 fixed to an extension 148 of inner portion 136. An E-ring 150 restrains shaft 144 from lateral movement within its bushing mount. The opposite end of shaft 144 is rotatably supported within a bushing 152 formed as a part of inner frame portion 136.

Reflecting member 36 is driven from bell crank 118 into its exposure mode orientation by forces derived from low-rate multi-turn torsion drive spring 54. A stationary end 152 of spring 54 is fixed or grounded to frame portion 136, while its opposite end (not shown) is configured to engage a portion (not shown) of a cylindrically shaped sleeve 154. Sleeve 154 is generally configured as a right hollow cylinder having a portion 120 which is fixed to arm 114 through a pin 158 extending therethrough. Arm 114 extends upwardly from its connection with shaft 120 where it is rotatably connected to ram 96 through a pin 116. An outer plate 160 is positioned on the outward side of ram 96 and serves as a mounting platform for various gear linkages within gear train 86.

Drive spring 54 is prewound in such a manner as to bias shaft 120 in a clockwise direction as viewed in FIG. 2. Such clockwise rotation of shaft 120 moves bell crank 118 and the associated four-bar linkage 112 upwardly. This movement of four-bar linkage 112 causes reflecting member 36 to rotate into its exposure mode position.

Figure 3:
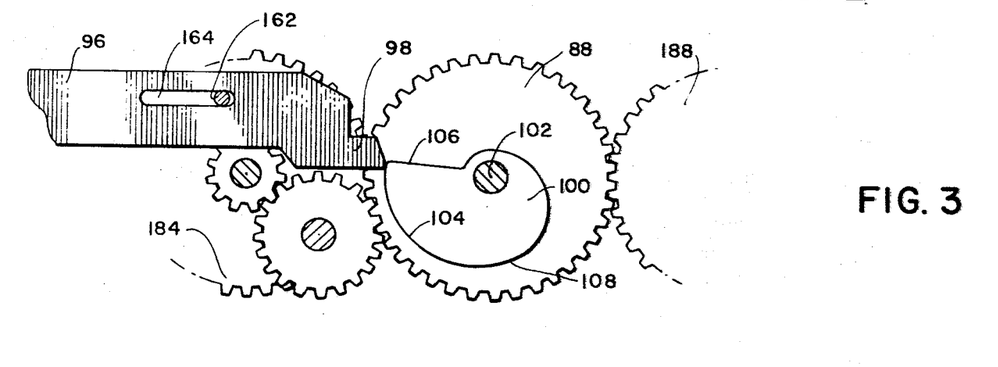
FIG. 3 is a fragmentary elevational view of portions of the drive mechanism of the camera of FIG. 1 showing components in a viewing mode orientation.

Referring to FIGS. 2 and 3, the torque modulating assembly or dynamic control assembly of camera 10 is shown. Ram 96 is supported at end 110 by pin 116 and, at its other end, by a pin 162 mounted upon outer plate 160. Pin 162 slideably supports ram 96 from a slot 164 formed within ram 96. The forwardmost portion of ram 96 is formed as a cam follower 98 engageable with cam 100. The engagement of cam 100 and follower 98 serves to retain reflecting member 36 at its cocked viewing position against the bias imparted thereto from drive spring 54 through the four-bar linkage 112. Additionally, the engagement serves to retain ram 96 in its rearwardmost position against the biasing of drive spring 54 through shaft 120 and arm 114.

Fixed for co-rotation with timing gear 88 about a hub 102, cam 100 is configured having a high-dwell portion 104, a rapid drop-off portion 106, and a rising profile portion 108. The engagement of follower 98 with high-dwell portion 104 of cam 100 serves to retain ram 96 in its rearwardmost orientation. This engagement is illustrated in enhanced detail in FIG. 3.

Figure 7:
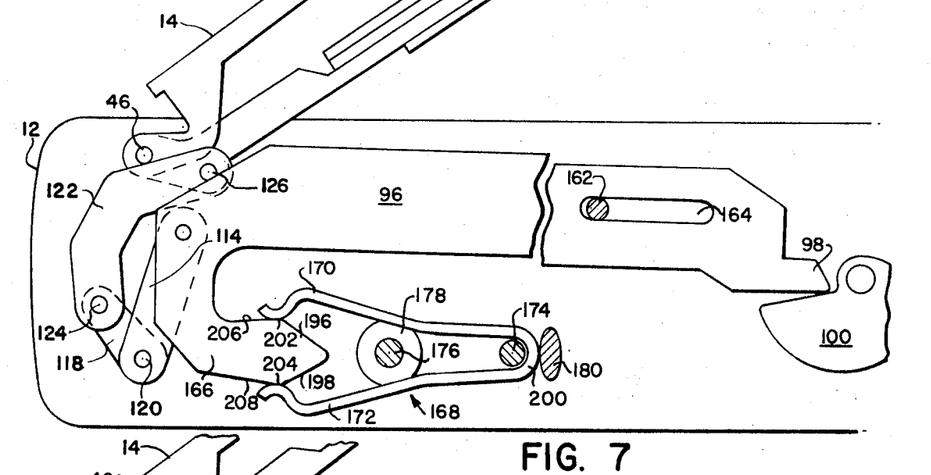
FIG. 7 is an enlarged side elevational view of a portion of the camera of FIG. 1, similar to FIG. 4 but showing the orientation of components during another intermediate stage of a photographic cycle.

As seen in FIG. 7, a generally arrow-shaped extension 166 is formed as a part of ram 96 at the lower rearward edge thereof. Extension 166 is configured having two inclined surfaces 196 and 198, two dwell portions 202 and 204, and two slightly inclined surfaces 206 and 208. Surface 206 is configured having an opposite inclined slope from that of surface 196. Likewise, surface 208 has an opposite inclined slope from that of surface 198. Dwell portions 202 and 204 represent inflection points between surfaces 206 and 196 and between surfaces 208 and 198, respectively.

Positioned within the locus of travel of extension 166 is a force-modulating spring shown generally at 168. Spring 168 is configured having two resilient engageable end portions 170 and 172 and is mounted upon a pin 174 extending inwardly from outer plate 160. A second pin 176 and an associated washer 178 limit the rotation of spring 168 about pin 174. Positioned behind spring 168 at spring end 200 is a stop element 180 extending inwardly from outer plate 160. Element 180 serves to restrain spring 168 from lateral movement when it is engaged by extension 166.

The earlier-described initial brief energization of motor 82 causes a slight rotation (approximately 10°) of timing gear 88. Cam 100, in turn, rotates and ram end 98 falls off the high-dwell portion 104 of cam 100 and across its rapid drop-off portion 106. The kinematic linkage then assumes the orientation depicted in FIG. 2. Thus unlatched, ram 96 slides forwardly under the bias imparted from drive spring 54 through shaft 120 and bell crank 114.

Figure 6:
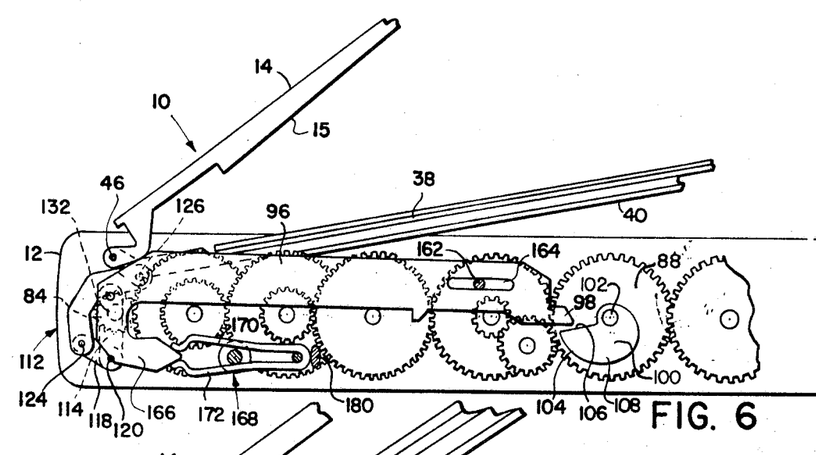
FIG. 6 is a side elevational view of the camera of FIG. 1 with portions broken away or removed to clearly reveal the gear train and reflecting member thereof during an intermediate stage of a photographic cycle.

Release of ram 96 permits reflecting member 36 to move upwardly under the bias of drive spring 54 imparted through four-bar linkage 112. Due to the prewound status of spring 54, a sufficient force is imparted to reflecting member 36 to cause the latter to accelerate upward from its viewing position. Free acceleration of member 36 is permitted through approximately 10° of initial rotation. This free acceleration has been shown in connection with FIG. 9. As the reflecting member 36 passes through this initial 10° of rotation, ram 96 moves to a position where extension 166 begins to engage torque-modulating spring 168. Due to the resiliency of spring end portions 170 and 172, spring 168 is capable of selectively retarding the motion of ram 96. Note in FIG. 6 that extension 166 engages spring end portions 170 and 172 along inclined surfaces 196 and 198, respectively, as initial contact is made. Once the engagement has been established, movement of extension 166 separates end portions 170 and 172, the latter resisting this separation.

Figure 8:
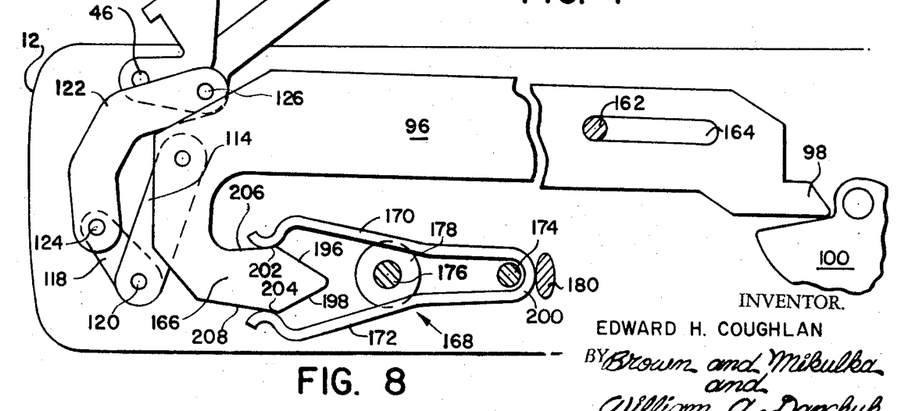
FIG. 8 is an enlarged fragmentary side elevational view of the camera of FIG. 1 showing the orientation of components of the drive assembly and reflecting member during a post-exposure stage of a photographic cycle.

Due to the configuration of inclined surfaces 196 and 198, and the resiliency of spring ends 170 and 172, a retarding force is applied to arrow extension 166 and ram 96. This force restrains the forward movement of ram 96 a sufficient amount to impart a lowering of the acceleration thereof. Retardation of ram 96 is transferred to reflecting member 36 through control linkage 95, resulting in a lowering of the acceleration of member 36. As the movement of ram 96 continues, inclined surfaces 196 and 198 progress through spring ends 170 and 172, providing an increasing retardation force to ram 96 and reflecting member 36. The lowering of the acceleration rate of ram 96 and operator assembly 36 progresses through approximately 22° of reflecting member rotation whereupon a negative acceleration is realized. This is shown in FIG. 9 as a passing of the acceleration curve through zero acceleration. Negative acceleration continues until such time as ram 96 moves forward to a position where spring ends 170 and 172 move off of surfaces 196 and 198 and onto dwell portions 202 and 204. Dwell portions 202 and 204 represent inflection points between surfaces 196 and 198 and 206 and 208. Movement of spring ends 170 and 172 onto dwell portions 202 and 204 occurs when reflecting member 36 has reached a rotational status of approximately 33°. At this position, there is a discontinuance of the retarding force applied to ram 96 and operator assembly 36. As ram 96 moves forwardly, spring ends 170 and 172 engage inclined surfaces 206 and 208 (see FIG. 8). Surfaces 206 and 208, respectively, are configured having oppositely inclined slopes from those of surfaces 196 and 198. Accordingly, as extension 166 continues its forward movement, spring ends 170 and 172 begin to move toward each other, inducing a reversal of the sign of the translational force vector applied to extension 166. This positive vector forward force which is applied to ram 96 provides an acceleration of ram 96 and reflecting member 36. The rapid increase in acceleration continues for short duration (approximately 1° of rotation) until the acceleration rate is returned to a level commensurate with that which reflecting member 36 had prior to torque modulation. Reflecting member 36 is accelerated the last 4° of rotation (from 33° to 37°) until it makes contact with rear wall 14. At that time, reflecting member 36 will have rotated a total of approximately 37° from its viewing position to its exposure position.

Figure 5:
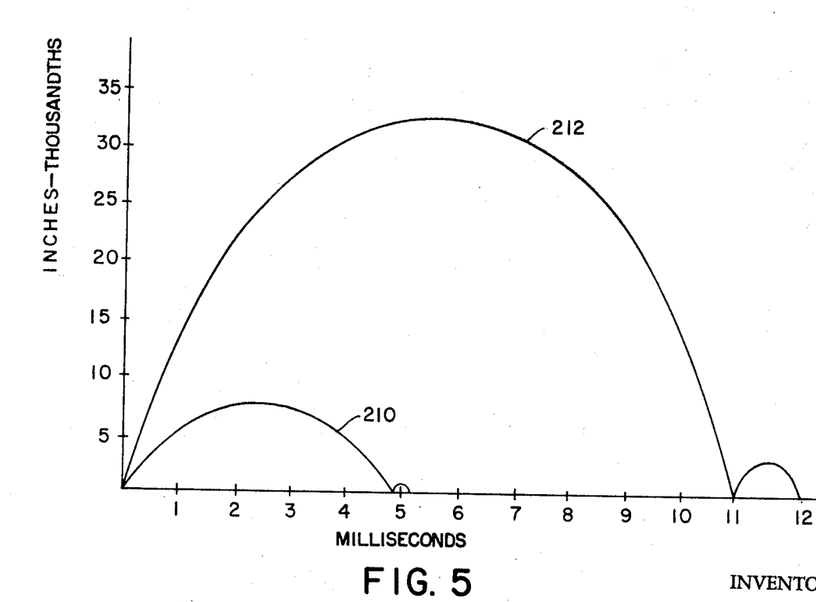
FIG. 5 is a chart showing the relative amplitudes and frequency of bounce of the reflecting member of the camera of FIG. 1 with and without the incorporation of the present invention.

Upon reaching its exposure position, reflecting member 36 strikes stationary rear wall 14 and elastically rebounds under the control of the residual forces developed over the final 4° of its rotational movement. Referring to FIG. 5, the relative amplitudes and periods of rebound of reflecting member 36 for both employment and nonemployment of the present invention are shown. For instance, rebound curve 210 depicts the relative amplitude and period for both primary and secondary rebounds of reflecting member 36 with the employment of the torque-modulating assembly, while rebound curve 212 represents the reflecting member rebound without such employment. Since a properly focused photograph cannot be taken until such time as the elastic rebound of reflecting member 36 has been adequately dampened, the significantly smaller amplitude, short rebound bounce (curve 210) is more desirable than a larger amplitude, long period rebound (curve 212).

Reduction of both the amplitude and period of the reflecting member rebound is effected by a lowering of the acceleration rate of member 36 during specific portions of its rotational travel between its viewing and exposure positions. The effect of lowering the acceleration rate can best be seen by referring to FIGS. 9 – 11. As seen in FIG. 9, a lowering of the acceleration rate of reflecting member 36 is produced between approximately 10° and 22° of rotation. A negative acceleration of reflecting member 36 is produced between 27° and 33° of rotation. At 33°, the reversed force vector is applied to ram 96 (due to the movement of spring ends 170 and 172 off of inclined surfaces 196 and 198), resulting in a rapidly increasing acceleration of the reflecting member. The broken line portion in FIG. 9, as well as in FIGS. 10 and 11, represents the operational path through which reflecting member 36 would travel if no torque-modulating assembly were present. It should be noted that employment of ram 96 and force-modulating spring 168 produces a terminal acceleration rate and torque which is greater than that produced without such employment. This improved residual torque provides a force which is operative to retain the reflecting member at its exposure position. The greater the terminal torque applied to reflecting member 36 during its final segment of rotation the less elastic rebound will be realized when member 36 contacts rear wall 14.

Elastic rebound, although associated with many factors, is primarily a function of velocity. A body which strikes a stationary member at high velocity will "bounce" more than the same body with a lower velocity. Therefore, a minimization of the velocity at which a body strikes a stationary member is most desirable if rebound is to be minimized. The striking reflecting member velocity is minimized due to the lowering of the acceleration rate of reflecting member 36 which is produced through the engagement of arrow extension 166 with spring 168. Referring to FIG. 11, the relative striking velocities of reflecting member 36, with and without employment of the present invention, are shown. Note that the lowering of acceleration of reflecting member 36 during specific portions of its rotational travel results in a lower striking velocity. Although a lower velocity results in a minimization of elastic rebound, there is generated a slower rotational travel time. This slower travel time, however, is more than counteracted by a faster reflecting member damping time. Consequently, the combined travel and damping time of reflecting member 36 with the employment of the present torque-modulating system is substantially lower than that realized without such employment.

As may be evidenced from the foregoing, the reflex photographic apparatus of the present invention is capable of moving a reflecting member between a viewing position and an exposure position in a relatively short period of time but without elastic rebounding of the reflecting member when it is abruptly halted at its exposure position. Additionally, the selective acceleration arrangement is operative to provide a residual torque for retaining the operator assembly as its exposure position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Reflex photographic apparatus comprising:
   means defining an optical path having one configuration for viewing the image of a scene to be photographed and another configuration for imaging said scene at an exposure plane;
   reflecting reflecting movable between a viewing position and a terminal exposure position for selectively converting said optical path from one said configuration to the other;
   spring means having a given output force for driving said reflecting means to move from said viewing position to said terminal exposure position;
   control linkage means connected to said reflecting means and selectively actuable to release said reflecting means for movement by said spring means; and
   dynamic control means for selectively modulating said spring means drive to reduce the velocity of said reflecting means and said control linkage means during only a predetermined portion of said movement of said reflecting means, whereby reflecting means rebound is inhibited when said reflecting means is halted at said terminal exposure position.

2. Reflex photographic apparatus according to claim 1 in which said dynamic control means applies a positive accelerative force to said reflecting means subsequent to said velocity reduction and when said reflecting means is closely proximate said terminal exposure position.

3. The reflex photographic apparatus of claim 1 in which:
   said control linkage means includes a kinematic assembly connected for movement in correspondence with and in control over said reflecting means; and
   said dynamic control means is operative to impose said modulation of said spring means drive by exerting regulation over the said movement of said kinematic assembly.

4. The reflex photographic apparatus of claim 3 in which said dynamic control means is operative to apply a positive accelerative force to said reflecting means subsequent to said velocity reduction and when said reflecting means is closely proximate said terminal exposure position.

5. The reflex photographic apparatus of claim 3 in which said dynamic control means includes a resilient follower assembly controllably associated with said kinematic assembly for selectively effecting a deceleration of the movement of said kinematic assembly.

6. The reflex photographic apparatus of claim 5 in which:
   said dynamic control means includes a selectively inclined contact surface configured and arranged for slideable contact with said resilient follower assembly, said resilient follower assembly and said contact surface being operative, when in mutually sliding contact, to impose a predetermined deceleration upon the said movement of said reflecting means.

7. The reflex photographic apparatus of claim 6 wherein said contact surface and said resilient follower assembly are mutually spaced and arranged to effect said contact only during said predetermined portions of said movement of said reflecting means.

8. The reflex photographic apparatus of claim 6 in which said contact surface is configured and disposed having a first portion of predetermined inclination and slope of given size with respect to said follower assembly for effecting said velocity reduction.

9. The reflex photographic apparatus of claim 8 in which said contact surface is configured having a second portion of predetermined inclination and slope of sign opposite of said given sign for effecting a predetermined acceleration of said kinematic assembly and said reflecting means when said reflecting means is moving closely proximate to said terminal exposure position.

10. The reflex photographic apparatus of claim 6 in which said inclined contact surface is movable in correspondence with said kinematic assembly, said contact surface being movable into force modulating engagement with said resilient follower assembly during said predetermined portions of said reflecting means movement.

11. The reflex photographic apparatus of claim 10 in which said resilient follower assembly is rigidly mounted within the path of movement of said selectively inclined contact surface.

12. A hand-held photographic reflex camera comprising:
means defining an optical path having one configuration for viewing the image of a scene to be photographed and another configuration for recording said scene upon a film unit;
reflecting means movable about a given axis of rotation between a viewing position and an exposure position within said optical path for selectively converting said optical path from one said configuration to said other configuration;
spring means having a given torque characteristic for driving said reflecting means from said viewing position to said exposure position within a limited interval of time, said torque characteristic being selected to exert a residual retaining force upon said reflecting means when in said exposure position;
control linkage means connected to said reflecting means and movable in correspondence therewith for selectively releasing said reflecting means to move about said axis; and
dynamic control means engageable with said control linkage means for selectively modulating the said torque imparted to said reflecting means by said spring means to inhibit the rebound thereof at said exposure position while maintaining said residual retaining force.

13. The photographic reflex camera of claim 12 wherein said dynamic control means is operative to selectively inhibit the said movement of said control linkage means until said reflecting means is closely proximate said exposure position.

14. The photographic reflex camera of claim 12 in which said dynamic control means is operative to exert an input force having a vector sense positive with respect to the said residual retaining force when said reflecting means is closely proximate said exposure position.

15. The photographic reflex camera of claim 13 in which:
said control linkage means includes a kinematic assembly connected for movement in correspondence with and in control over said operator means; and
said dynamic control means is operative to impose said modulation by exerting a select regulation over said movement of said kinematic assembly.

16. The reflex camera of claim 15 in which said dynamic control means includes a resilient follower assembly controllably associated with said kinematic assembly for selectively effecting a deceleration of the movement of said kinematic assembly.

17. The reflex camera of claim 16 in which:
said dynamic control means includes a selectively inclined contact surface configured and arranged for slideable contact with said resilient follower assembly, said resilient follower assembly and said contact surface being operative, when in mutually sliding contact, to impose a predetermined deceleration upon said movement of said reflecting means.

* * * * *